(12) United States Patent
Yang et al.

(10) Patent No.: US 9,037,128 B2
(45) Date of Patent: May 19, 2015

(54) HANDLE FOR HANDHELD TERMINAL

(71) Applicants: Jinrong Yang, Shanghai (CN); Ramzi Khalil Maalouf, Chevy Chase, MD (US)

(72) Inventors: Jinrong Yang, Shanghai (CN); Ramzi Khalil Maalouf, Chevy Chase, MD (US)

(*) Notice: Subject to any disclaimer, the term of this patent is extended or adjusted under 35 U.S.C. 154(b) by 0 days.

(21) Appl. No.: 14/475,137

(22) Filed: Sep. 2, 2014

(65) Prior Publication Data

US 2014/0370880 A1 Dec. 18, 2014

Related U.S. Application Data

(63) Continuation of application No. 13/961,670, filed on Aug. 7, 2013.

(30) Foreign Application Priority Data

Nov. 28, 2012 (CN) .......................... 2012 2 0638696

(51) Int. Cl.
H04M 1/04 (2006.01)
H04N 5/232 (2006.01)
H04N 5/225 (2006.01)
H04M 1/725 (2006.01)
H04W 88/02 (2009.01)

(52) U.S. Cl.
CPC .............. H04M 1/04 (2013.01); H04N 5/23203 (2013.01); H04N 5/2252 (2013.01); H04N 5/232 (2013.01); H04M 1/7253 (2013.01); H04W 88/02 (2013.01)

(58) Field of Classification Search
USPC ............ 455/419, 552.1, 556.1, 557; 709/203, 709/227
See application file for complete search history.

(56) References Cited

U.S. PATENT DOCUMENTS

| | | |
|---|---|---|
| 5,872,565 A | 2/1999 | Greaves et al. |
| 6,417,797 B1 | 7/2002 | Cousins et al. |
| 6,965,400 B1 | 11/2005 | Haba et al. |
| 6,976,111 B1 | 12/2005 | Mills et al. |
| 7,404,001 B2 | 7/2008 | Campbell et al. |
| 7,412,259 B2 | 8/2008 | Yoo et al. |
| 8,244,299 B1 | 8/2012 | Bishop |
| 8,385,974 B1 | 2/2013 | Bishop |
| 8,577,412 B1 | 11/2013 | Bishop |
| 8,832,287 B2 | 9/2014 | Yang et al. |
| 8,842,155 B2 | 9/2014 | Border et al. |
| 8,915,660 B1 | 12/2014 | Ben Yehuda et al. |
| 2002/0024506 A1 | 2/2002 | Flack et al. |
| 2002/0044225 A1 | 4/2002 | Rakib |
| 2002/0183102 A1 | 12/2002 | Withers et al. |
| 2009/0185040 A1 | 7/2009 | Yang et al. |
| 2012/0081500 A1 | 4/2012 | Border et al. |
| 2013/0005401 A1 | 1/2013 | Rosenhan et al. |
| 2013/0233986 A1 | 9/2013 | Rasheta |
| 2014/0093229 A1* | 4/2014 | Lecuna Aguerrevere ..... 396/420 |
| 2014/0146193 A1 | 5/2014 | Yang et al. |

OTHER PUBLICATIONS

Zacuto, "iPhone 3gs Accessories Video", Jul. 13, 2009, pp. 1-8.

* cited by examiner

Primary Examiner — Sam Bhattacharya
(74) Attorney, Agent, or Firm — Stephen A. Mason; Meyertons, Hood, Kivlin, Kowert & Goetzel, P.C.

(57) ABSTRACT

A handle for a handheld terminal includes a first interface module, a first key module, a first power supply module, and a base handle module. The handle couples with the handheld terminal. The handle makes a wireless connection with the handheld terminal the first interface module or a wired connection with the handheld terminal via the first interface module. The first key module includes one or more user operation command keys. The first power supply module supplies power for the handle. The handle is operable with one hand.

29 Claims, 2 Drawing Sheets

HANDLE FOR HANDHELD TERMINAL

This application is a continuation of U.S. patent application Ser. No. 13/961,670, filed Aug. 7, 2013, entitled "Handle for Handheld Terminal", which is hereby incorporated by reference in its entirety.

This application also claims priority to WO/2014/082378, filed Nov. 28, 2013, entitled "One-Hand Manipulation Handle for Hand-Held Terminal", which is hereby incorporated by reference in its entirety.

This application also claims priority to Chinese Application No. 201220638696.7, filed Nov. 28, 2012, entitled "One-Hand Manipulation Handle for Hand-Held Terminal", which is hereby incorporated by reference in its entirety.

BACKGROUND

1. Field

The present disclosure relates to a handle, in particular to a handle for mobile phone or other handheld terminals that can be used in taking photographs and creating videos.

2. Description of the Related Art

Handheld terminals, such as mobile phones, are becoming ever more widely used. With the advances in science and technology, the quality of camera technology in handheld terminals taking photos and creating video has improved.

As mobile phone photos or videos have become easier and convenient for timely viewing, transfer and sharing, users of handheld terminals are inspired to take more photos or videos with their handheld terminals. For many people, the frequency of mobile phone shooting has exceeded that of photos taken using a conventional camera. However, a typical mobile phone camera may have features that are not optimized for photography. For example, many handheld terminals are characterized by inconvenient operation, such as poor gripping, and by poor shooting effects. Also, with some handheld terminals, it may be difficult to take photos or videos with one hand.

SUMMARY

Systems and methods are described herein for holding and operating handheld terminal devices, such as mobile phones. According to one embodiment, a handle for a handheld terminal includes a first interface module, a first key module, a first power supply module, and a base handle module. The handle couples with the handheld terminal. The handle makes a wireless connection with the handheld terminal the first interface module or a wired connection with the handheld terminal via the first interface module. The first key module includes one or more user operation command keys. The first power supply module supplies power for the handle. The handle is operable with one hand. In some embodiments, the handheld terminal is held in a chuck that adjusts to couple to the housing of the handheld terminal. In certain embodiments, the handle allows a user to operate a camera of a mobile phone remotely.

According to one embodiment, a method of using a handheld terminal includes coupling a handle to a handheld terminal comprising a camera, and operating one or more keys on the handle to control one or more operations on the camera.

Figure 1:
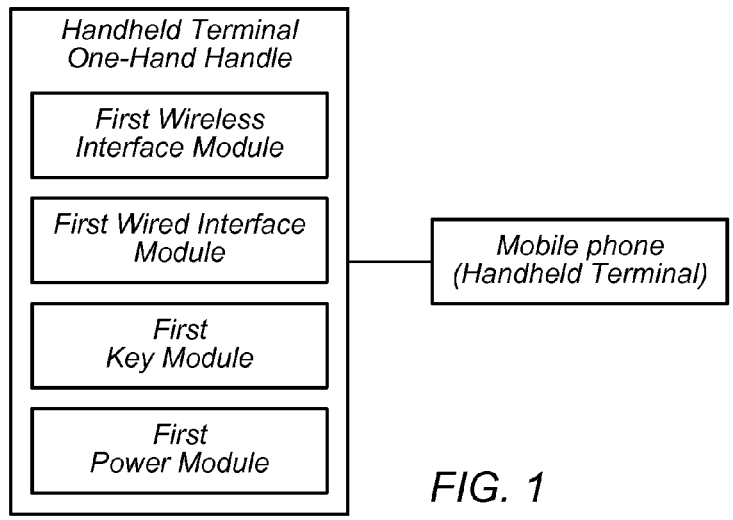
FIG. 1 is the modular structure diagram of a one-hand handle according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In some embodiments, a handheld terminal one-hand handle fixes (for example, secures or holds) a mobile phone or other handheld terminal via the handle, operates the mobile phone or handheld terminal shooting function via buttons on the handle. In certain embodiments, remote control operations can also be performed (for example, a non-fixed mode). Illustrative embodiments of a handle are described as below.

In some embodiments, a one-hand handle module include a first wireless interface module and/or the first wired interface module, a first key module, and a first power module. The one-hand handle has a wireless connection with the handheld terminal via the first wireless interface module or has a wired connection via the first wired interface module. The first key module is provided with a user operation command key. The first power supply module supplies work power for the one-hand handle.

A handle base module includes a transformable chuck, handle pillar, and handle tripod. The handle pillar includes a slot sliding plate, buttons, magnets and springs. The buttons and magnets are used to control the slot sliding plate.

When the slot sliding plate is pulled out to the appropriate length and placed in the handheld terminal device, the spring may lock the handheld terminal, fixes via the buttons and the magnets. The sliding of the slot is used to fix the handheld terminal after opening along with the chuck.

In some embodiments, a user operation command keys include one or more of a camera key, video key and zoom key, camera/video shift key and zoom key. The first wireless interface module may be WIFI or Bluetooth. The first interface module may be, in various embodiments, a USB interface or an iPhone interface connected with the handheld terminal.

The first key module may be available for users to input command. The first power supply module may include lithium-ion batteries, nickel-cadmium batteries, button batteries or dry batteries, which can be charged and discharged.

The gripping position of the one-hand handle may be equipped with anti-slip material or coating. The USB interface or iPhone interface may be positioned at the handheld terminal behind the handheld base module and the contact surface of the one-hand handle, or the USB interface or iPhone interface is at the side surface of handheld terminal, and can connect with the handheld terminal via the lead. The handheld terminal is mobile phone.

The one-hand handle may include a remote control of the mobile phone. The one-hand handle may have the following advantages (in a mobile phone for example): the handle may realizes the transformation from the behavior pattern of operating the mobile phone for taking pictures or videos to the behavior pattern of one-hand operating mobile phone, controlling the camera or video function of the handheld terminal, so that the handheld terminal is convenient and comfortable holding. The one hand handle may also provide stability and security.

Illustrative Embodiment

As shown in FIG. 1, it is a modular structure diagram of the one-hand handle of the utility model handheld terminal in the preferred embodiment, the one-handed handle is equipped with handle module and handle base module. The handle comprises of the first wireless interface module and/or the first wired interface module as well as the first key module and the first power module; the handle base comprises of chuck module, handle pillar module and handle foot stand module. The one-hand handle has connection with the handheld terminal via the first wireless interface module, or has wired connection via the first wired interface module.

Figure 2:
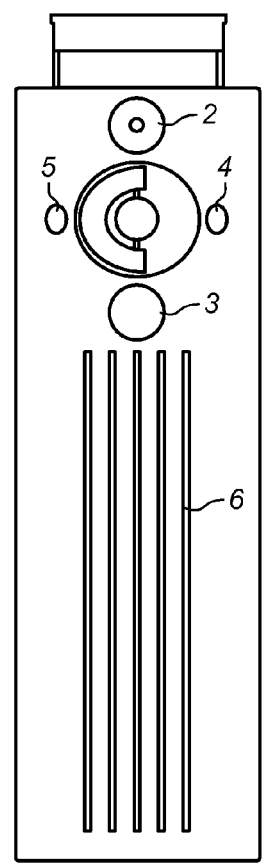
FIG. 2 is the front view illustrating a one-hand handle in one embodiment.
Figure 3:
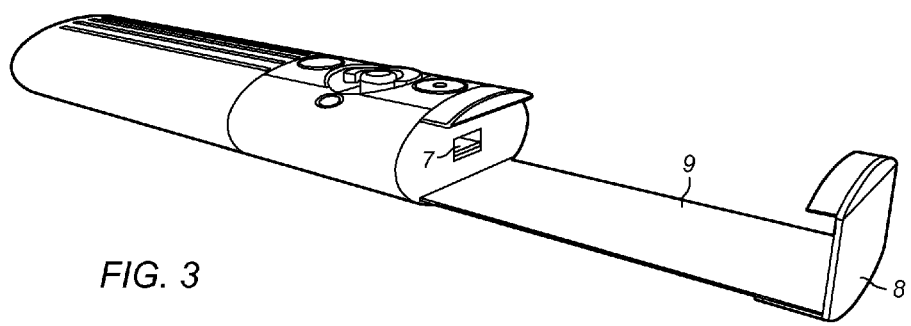
FIG. 3 illustrates the one-hand handle's slot sliding plate pulling state diagram in one embodiment.

As shown in FIG. 2 and FIG. 3, the handle base module comprises of transformable chuck 8, slot sliding plate 9, magnet and spring, the button 1, the magnet, spring, button are used to control the openness and closing of slot sliding plate 9 and the real-time position of the slot sliding plate 9. The slot sliding plate 9 fixes the handheld terminal along with the transformable chuck 8.

The first key module equips with the user operation command key. The first power supply module supplies work power for the one-handed handle. The gripping position of the one-hand handle is also equipped with anti-slip material or member. This embodiment may include slots, such as slot 6.

The first key module may be available for users to input commands. The user operation command keys may include a camera key, video key and zoom key, or camera/video shift key and zoom key, or combinations thereof. FIG. 2 shows an example arrangement of keys, including the camera key 2, camera/video shift key, first zoom key 4, and second zoom button 5. The first zoom key 4 and the second zoom key 5 may correspond to the objects with different focal lengths.

A wireless interface module may be, in various embodiments, WIFI or Bluetooth. An interface module may include a USB interface or I Phone interface connected with the handheld terminal.

In some embodiments, the first power supply module is lithium-ion batteries, nickel-cadmium batteries, button batteries or dry batteries, which can be charged and discharged.

As shown in FIG. 3, an interface (for example, USB or iPhone) is positioned at the handheld terminal behind the handheld base module and the contact surface of the one-hand handle. In one embodiment, interface 7 may be the interface connecting with an iPhone. In another embodiment, the USB interface or iPhone interface may be at the side surface of handheld terminal and can connect with the handheld terminal via the lead.

Figure 4:
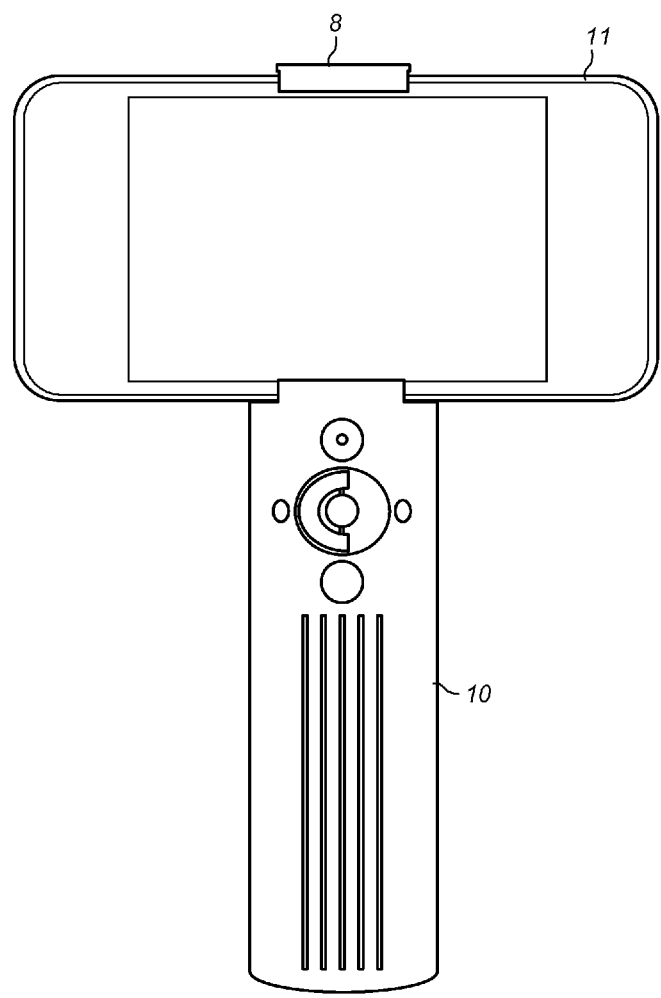
FIG. 4 illustrates a fixed mobile phone one-hand handle's usage state diagram in one embodiment.

In some embodiments, the handheld terminal being held by a handle is a mobile phone. FIG. 4 illustrates a mobile phone held in a chuck of a handle. One or more magnets, springs, and buttons of handle 10 may be used to control the opening and closing of slot sliding plate 9, and holding of handheld 11 in the chuck. The real-time position of the slot sliding plate 9, the slot sliding plate 9 fixes the handheld terminal along with the transformable chuck 8. After being positioned, the slot sliding plate 9 will not move up and down, thus one-hand operating the mobile phone command will become much easier.

In some embodiments, a one-hand handle can also be used as the remote control of the mobile phone.

The various methods as illustrated in the figures and described herein represent exemplary embodiments of systems and methods. The systems and methods may be implemented manually, in software, in hardware, or a combination thereof. The order of any method may be changed, and various elements may be added, reordered, combined, omitted, modified, etc. Additionally, various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A handheld device for holding and operating a mobile phone, the handheld device comprising:
   a handle;
   a coupler that couples the handle of the handheld device to a housing of the mobile phone wherein the coupler is configured to releasably affix the handheld device to the housing of the mobile phone;
   a power supply module with one or more batteries for providing power for a wireless connection to the mobile phone;
   a wireless interface module configured to provide the wireless connection to the mobile phone, wherein the handheld device is configured to provide remote control of camera features of the mobile phone via the wireless interface module;
   a user-operated command key comprising at least one selected from a camera key, video key, or zoom key, the user-operated command key configured for selection by a user; and
   a key module configured to receive an indication of selection of the user-operated command key and send an indication of the selection to the mobile phone via the wireless interface module such that the mobile phone can be held via the handheld device with one hand and such that the one hand can operate user-operated command key while the one hand is also holding the handheld device.

2. The handheld device of claim 1, further comprising a handle pillar configured for a non-fixed mode wherein the handle pillar and the mobile phone are not coupled in the non-fixed mode, wherein the handle pillar comprises the wireless interface module, and wherein the handle pillar is configured to provide remote control of the mobile phone via the wireless interface module while in the non-fixed mode.

3. The handheld device of claim 2, wherein the handle pillar is configured to be held by a user of the mobile phone, and wherein the handle pillar is configured to provide an alternative to the mobile phone being held directly by the user.

4. The handheld device of claim 1, further comprising a handle foot stand.

5. The handheld device of claim 1, wherein the wireless interface module comprises a Bluetooth wireless interface module.

6. The handheld device of claim 1, wherein the coupler is configured to adjustably couple to mobile phones of various sizes.

7. The handheld device of claim 1, wherein the coupler comprises a chuck configured to hold the mobile phone.

8. The handheld device of claim 7, wherein the chuck is spring-loaded such that the chuck holds the mobile phone when the chuck is in place around the mobile phone.

9. The handheld device of claim 1, wherein when coupled to the mobile phone, the handheld device transforms the mobile phone from a device configured for direct two-handed holding and operation to a device configured for indirect one-handed holding and operation via the handheld device.

10. The handheld device of claim 9, wherein the handheld device, when coupled to the mobile phone, provides stable and secure hold and control of the mobile phone.

11. A handheld device for holding and operating a mobile phone comprising:
 a that couples a handle of the handheld device to a housing of the mobile phone wherein the coupler is configured to releasably affix the handheld device to the housing of the mobile phone;
 a wireless interface module configured to provide a wireless connection to the mobile phone, wherein the handheld device is configured to provide remote control of camera features of the mobile phone via the wireless interface module;
 a user-operated command key, the user-operated command key comprising at least one selected from a camera key, video key, or zoom key, wherein the user-operated command key is configured on the handheld device such that the mobile phone can be held via the handheld device with one hand and such that the one hand can operate the user-operated command key while the one hand is also holding the handheld device;
 a power supply module with one or more batteries for providing power for the wireless connection to the mobile phone; and
 a gripping position comprising anti-slip material.

12. The handheld device of claim 11, further comprising a handle pillar configured for a non-fixed mode wherein the handle pillar and the mobile phone are not coupled, and wherein the handle pillar comprises the wireless interface module and is configured to provide remote control of the mobile phone via the wireless interface module while in the non-fixed mode.

13. The handheld device of claim 11, further comprising a key module configured to:
 receive an indication of selection of the user-operated command key; and
 send an instruction to the mobile phone via the wireless interface module, the instruction corresponding to the indicated selection.

14. The handheld device of claim 11, further comprising a handle pillar, wherein the handle pillar is configured to provide one-hand operation of the user-operated command key of the mobile phone via the same hand that holds the handle pillar.

15. The handheld device of claim 11, further comprising a handle foot stand.

16. The handheld device of claim 11, wherein the wireless interface module comprises a Bluetooth wireless interface module.

17. The handheld device of claim 11, wherein the handheld device further comprises:
 a button to control the coupler that couples the handheld device to the housing of the mobile phone.

18. The handheld device of claim 17, further comprising a handle pillar, wherein to releasably affix the handheld device to the housing of the mobile phone the coupler is configured to adjust to mobile phones of various sizes.

19. The handheld device of claim 11, further comprising a handle pillar, wherein the handle pillar provides the remote control of the mobile phone irrespective of whether the handle pillar is physically coupled to the mobile phone.

20. The handheld device of claim 11, further comprising a chuck configured to hold the mobile phone.

21. The handheld device of claim 20, wherein the chuck is spring-loaded such that the chuck holds the mobile phone when the chuck is in place over handheld terminal.

22. The handheld device of claim 11, further comprising a handle pillar,
 wherein the handle pillar is configured to hold and operate the mobile phone,
 wherein the handle pillar is configured to be held by a user of the mobile phone,
 wherein the handle pillar is configured to provide an alternative to holding the mobile phone directly,
 wherein when coupled to the mobile phone, the handheld device transforms the mobile phone from direct two-handed operation of camera or video functions to indirect one-handed operation of camera or video functions via the handheld device, and,
 wherein the handheld device, when coupled to the mobile phone, provides stable and secure hold and control of the mobile phone.

23. A method of providing remote control of a mobile phone comprising:
 receiving an indication of an input command from an operation command key of a handheld device comprising a coupler configured to couple the handheld device to the mobile phone, the operation command key configured on the device such that the mobile phone can be held via the handheld device with one hand and such that the one hand can operate user-operated command key while the one hand is also holding the handheld device;
 providing a wireless interface module configured to provide a wireless connection to the mobile phone; and
 sending the indication of the input command, in response to receipt of the indication, to the mobile phone via the wireless interface module.

24. The method of claim 23, wherein the handheld device comprises a handle pillar comprising the wireless interface module and wherein the wireless interface module comprises a Bluetooth interface module for providing the wireless connection to the mobile phone.

25. The method of claim 23, wherein the handheld device comprises a handle pillar, wherein the input command is one of a zoom command, camera command, or video command and wherein the handle pillar comprises at least two different input buttons selected from a zoom button, a camera button or a video button, each input button for indicating selection of a respective input command.

26. The method of claim 23, further comprising providing, by the handheld device, feedback that the mobile phone received the input command.

27. The method of claim 23, wherein the wireless interface comprises a Bluetooth interface.

28. The method of claim 23, wherein the handheld device comprises a handle pillar, and wherein the handle pillar is configured to act as a remote control of the mobile phone irrespective of whether the handle pillar is coupled to the mobile phone.

29. The method of claim 23, wherein the handheld device comprises a handle pillar, the method further comprising:
- providing, via the handheld device, stable and secure hold and control of the mobile phone;
- wherein the handheld device is configured to hold and operate the mobile phone,
- wherein the handle pillar is configured to be held by a user of the mobile phone,
- wherein the handle pillar is configured to provide an alternative to the mobile phone being held directly,
- wherein when coupled to the mobile phone, the handheld device transforms the mobile phone from direct two-handed operation of camera or video functions to indirect one-handed operation of camera or video functions via the handheld device, and
- wherein the handheld device, when coupled to the mobile phone, provides stable and secure hold and control of the mobile phone.

\* \* \* \* \*